United States Patent
Landowski et al.

(10) Patent No.: US 8,952,868 B2
(45) Date of Patent: Feb. 10, 2015

(54) METHOD, APPARATUS AND SYSTEM ON A CHIP FOR CONTROLLING A STEREOSCOPIC DISPLAY DEVICE

(71) Applicants: Roger Landowski, Erie, CO (US); Greg Graham, Boulder, CO (US); Terry Norton, Denver, CO (US); Robert Rotzoll, Cascade, CO (US)

(72) Inventors: Roger Landowski, Erie, CO (US); Greg Graham, Boulder, CO (US); Terry Norton, Denver, CO (US); Robert Rotzoll, Cascade, CO (US)

(73) Assignee: RealD Inc., Beverly Hills, CA (US)

( * ) Notice: Subject to any disclaimer, the term of this patent is extended or adjusted under 35 U.S.C. 154(b) by 71 days.

(21) Appl. No.: 13/906,058

(22) Filed: May 30, 2013

(65) Prior Publication Data

US 2013/0321722 A1 Dec. 5, 2013

Related U.S. Application Data

(60) Provisional application No. 61/653,326, filed on May 30, 2012.

(51) Int. Cl.
*G09G 5/00* (2006.01)
*G02B 27/22* (2006.01)
*H04N 13/04* (2006.01)
*G02B 27/26* (2006.01)
*G09G 3/20* (2006.01)

(52) U.S. Cl.
CPC .............. *G02B 27/22* (2013.01); *H04N 13/04* (2013.01); *G02B 27/26* (2013.01); *G09G 3/2085* (2013.01); *H04N 13/0434* (2013.01); *H04N 13/0438* (2013.01)

USPC ............................................................ 345/6

(58) Field of Classification Search
CPC .............. G09G 3/003; H04N 13/0497; H04N 13/0422; H04N 13/0404; H04N 13/0495
USPC ............................................................ 345/6
See application file for complete search history.

(56) References Cited

U.S. PATENT DOCUMENTS

| | | | |
|---|---|---|---|
| 4,281,341 A | 7/1981 | Byatt | |
| 6,975,345 B1 | 12/2005 | Lipton | |
| 7,646,537 B2 * | 1/2010 | Shestak | 348/57 |
| 8,711,060 B2 * | 4/2014 | Jung et al. | 345/6 |
| 2008/0316303 A1 | 12/2008 | Chiu | |
| 2011/0032345 A1 | 2/2011 | Robinson | |
| 2012/0293753 A1 | 11/2012 | McKnight | |

* cited by examiner

*Primary Examiner* — Kevin M Nguyen
(74) *Attorney, Agent, or Firm* — Darlene K. Kondo; Neil G. Mothew (57) ABSTRACT

This disclosure provides a technique for controlling the slew rate and number of transition segments used to move the LC drive voltage level from one voltage to another. In one embodiment, a method of controlling a polarization modulator in a polarization-based stereoscopic display device may comprise providing digital signals to each of a plurality of drive circuits to generate a drive voltage from each drive circuit, where the drive voltages drive the polarization modulator. Such an exemplary method may also include determining a time sequential list of transition specifications configured to provide discrete transitions in one or more of the drive voltages. Then, in such methods, the digital signals provided to each of the one or more drive circuits receiving a transition may be adjusted, in accordance with the time sequential list, thereby altering their drive voltages based on the transition specifications.

20 Claims, 12 Drawing Sheets

METHOD, APPARATUS AND SYSTEM ON A CHIP FOR CONTROLLING A STEREOSCOPIC DISPLAY DEVICE

PRIORITY CLAIM

This disclosure claims priority to and is a nonprovisional conversion of U.S. Provisional Patent Application No. 61/653,326, entitled "Method, apparatus and system on a chip for controlling a stereoscopic display device," filed May 30, 2012, which is incorporated herein by reference in its entirety for all purposes.

TECHNICAL FIELD

This disclosure generally relates to controlling a stereoscopic display device, and more specifically relates to controlling the operation of a polarization modulator in a polarization-based stereoscopic display device.

BACKGROUND

Liquid Crystal (LC) devices used to control the polarization of transmitted light can be challenging to drive in a way that optimizes their performance while maintaining reasonable product cost and reliability. Polarization control panels (PCP), display devices having PCPs, and their operation have been described in commonly-owned U.S. patent application Ser. No. 12/156,683, entitled "Display Device," filed Jun. 4, 2008, and in commonly-owned U.S. patent application Ser. No. 12/853,265, entitled "Stereoscopic flat panel display with a continuously lit backlight," filed Aug. 9, 2010, both of which are herein incorporated by reference in their entireties for all purposes. The PCP has segments of LC, which in operation, presents a highly capacitive voltage variable load that is typically driven at fairly high voltage, thus imposing severe restrictions on the drive electronics.

SUMMARY

This disclosure provides a technique for controlling the slew rate and number of transition segments used to move the LC drive voltage level in a polarization control panel from one voltage to another, which may be achieved by reading a time sequential list of transition specifications and applying each transition specification to the input of the digital-to-analog converter (DAC) in each drive circuit in order to move the LC drive voltage level in a controlled fashion. The rate at which the DAC is updated may be controlled by a time base tick, which may be generated by a counter that divides down the system clock. Each transition specification defines which drive channel is to transition, the slew rate for the transition, the time at which the transition is to start, and the end voltage of the transition. The slew rate provided in the transition specification is the number of DAC counts to be added or subtracted from the current DAC value at each time base tick. The start time for the transition is the number of time base ticks since the last video synchronization signal. The target voltage is provided in DAC counts.

In one aspect, methods of controlling a polarization modulator in a polarization-based stereoscopic display device are disclosed. In an exemplary embodiment, such a method may comprise providing digital signals to each of a plurality of drive circuits to generate a drive voltage from each drive circuit, where the drive voltages drive the polarization modulator. Such an exemplary method may also include determining a time sequential list of transition specifications configured to provide discrete transitions in one or more of the drive voltages. Then, in such methods, the digital signals provided to each of the one or more drive circuits receiving a transition may be adjusted, in accordance with the time sequential list, thereby altering their drive voltages based on the transition specifications.

In another aspect, circuits for controlling a polarization modulator in a polarization-based stereoscopic display device are disclosed. In an exemplary embodiment, such a circuit may comprise a plurality of drive circuits, each configured to generate a drive voltage for driving the polarization modulator, and drive transition logic configured to provide digital signals to each of the plurality of drive circuits to generate the drive voltages from each drive circuit. Exemplary circuits may also include transition memory configured to store transition specifications configured to provide discrete transitions in one or more of the drive voltages. Such a circuit may further comprise a transition scheduler configured to determine a time sequential list for applying the transition specifications to one or more of the plurality of drive circuits. The transition scheduler will cause, in accordance with the time sequential list, the drive transition logic to adjust the digital signals provided to each of the drive circuits receiving a transition, thereby altering their drive voltages based on the transition specifications.

In yet other aspects, polarization-based stereoscopic display systems are disclosed. In one embodiment, an exemplary system may comprise a display assembly comprising a polarization control panel (PCP) and a liquid crystal display (LCD) panel, and a backlight panel for providing illumination to the LCD panel. In addition, such systems may comprise a PCP drive circuit for controlling the PCP, wherein the PCP circuit may comprise a plurality of drive circuits, each configured to generate a drive voltage for driving the polarization modulator, and drive transition logic configured to provide digital signals to each of the plurality of drive circuits to generate the drive voltages from each drive circuit. In addition, the PCP circuit may further comprise transition memory configured to store transition specifications configured to provide discrete transitions in one or more of the drive voltages, and a transition scheduler configured to determine a time sequential list for applying the transition specifications to one or more of the plurality of drive circuits. In such embodiments, the transition scheduler will cause, in accordance with the time sequential list, the drive transition logic to adjust the digital signals provided to each of the drive circuits receiving a transition, thereby altering their drive voltages based on the transition specifications. Such display systems may also include an image processing unit configured to provide image signals to the LCD panel and synchronization signals for use by the PCP drive circuit.

BRIEF DESCRIPTION OF THE DRAWINGS

Embodiments are illustrated by way of example in the accompanying figures, in which like reference numbers indicate similar parts, and in which.

DETAILED DESCRIPTION

Figure 1:
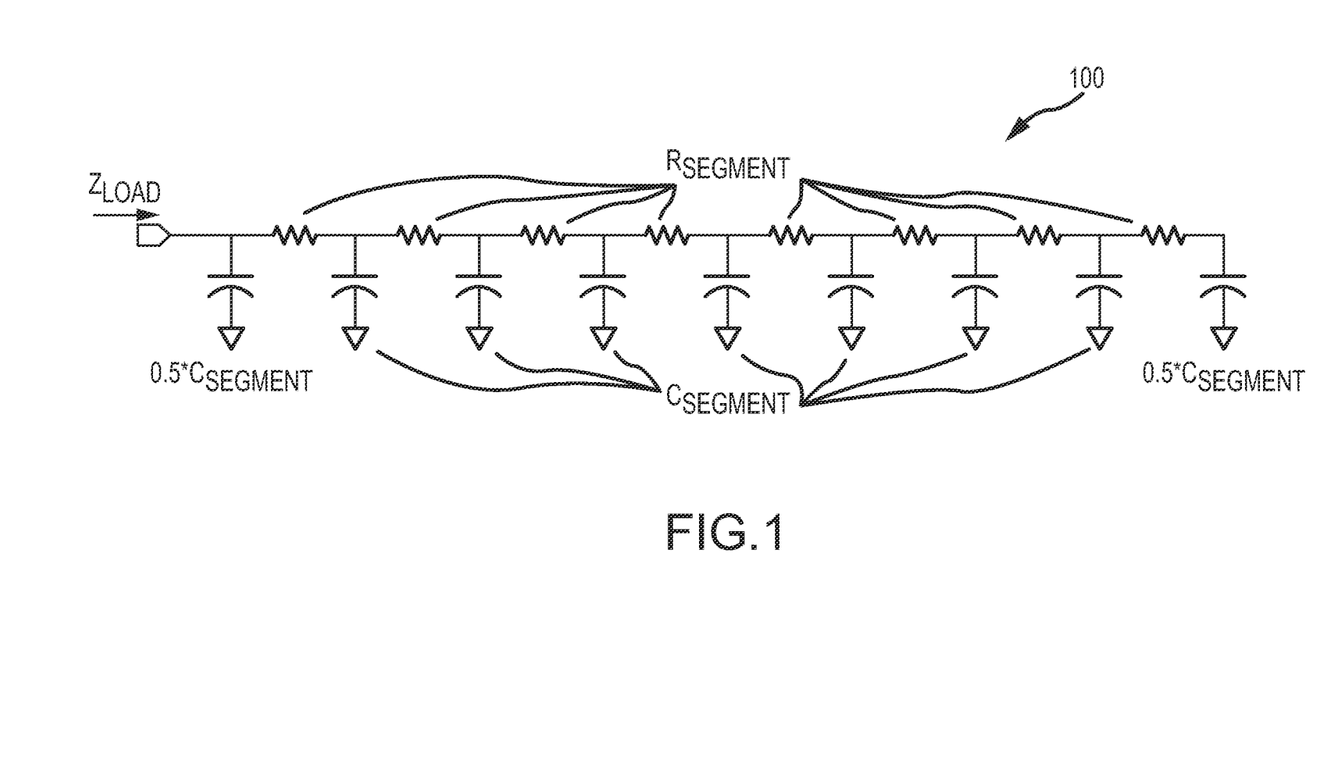
FIG. 1 is a schematic diagram illustrating an equivalent circuit for a segment of a PCP that is modeled as a distributed R-C network, in accordance with the present disclosure.

FIG. 1 is a schematic diagram illustrating an equivalent circuit 100 for a segment of a segmented polarizing modulator or Polarization Control Panel (PCP) that is modeled as a distributed R-C network. In this equivalent circuit 100, the PCP segment may have an equivalent capacitance ranging from hundreds of nano-Farads to tens of micro-Farads (µF), with sheet resistance in the approximate range of 100 ohms/square. Here, the resistance per segment of the PCP ($R_{segment}$) may typically be around 75 ohms, and the capacitance per segment of the PCP ($C_{segment}$) may typically be around 0.3 µF. The value of $C_{segment}$ may vary over a range of almost 5:1 with drive voltage, and the highest capacitance occurs at approximately the highest voltage. The $R_{segment}$ value is calculated as the material sheet resistance in ohms/square, multiplied by the length to width ratio of the PCP segment, divided by the number of segments used to model the stripe.

Figure 2:
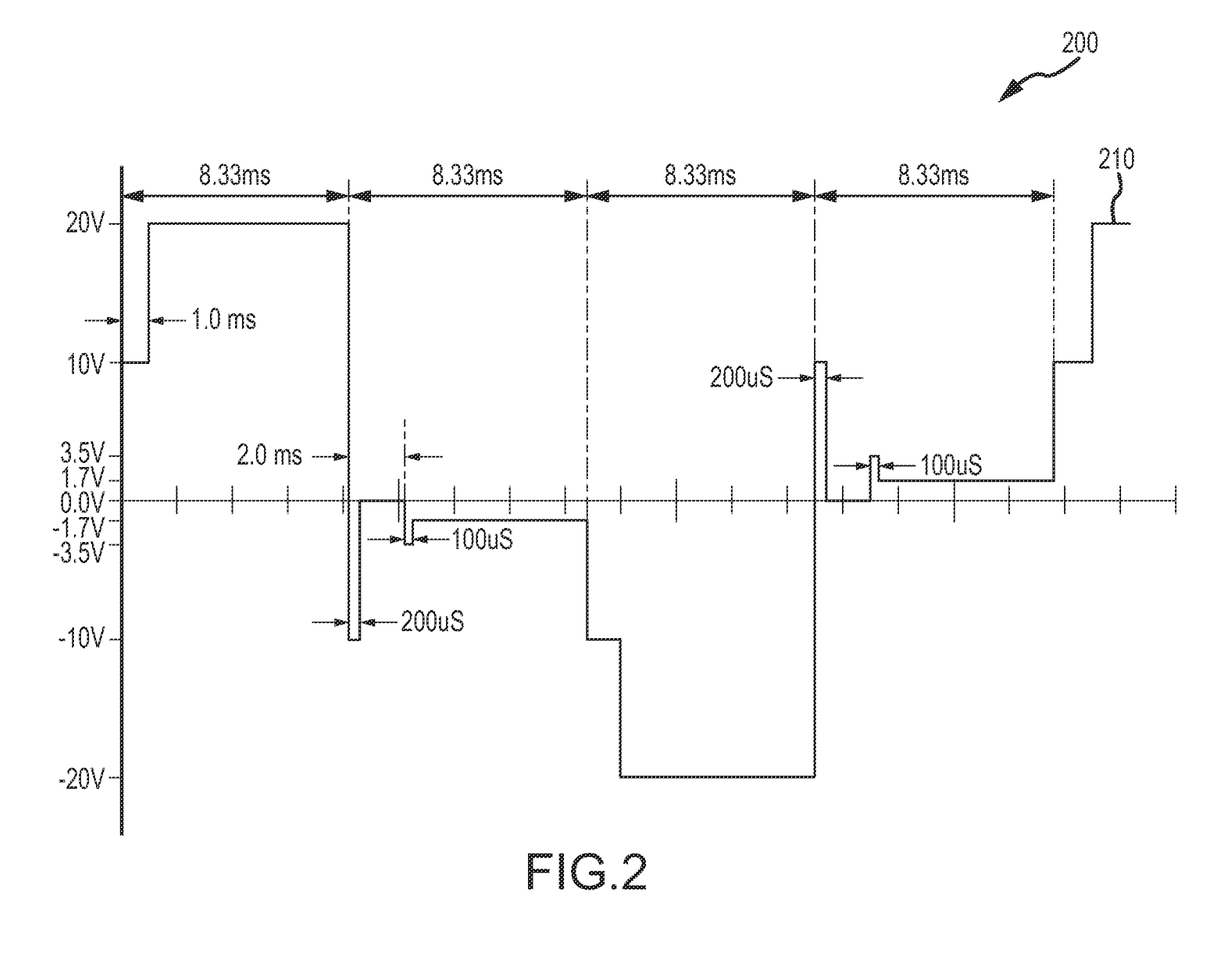
FIG. 2 is a schematic waveform diagram illustrating an exemplary drive waveform for driving a segment in a PCP, in accordance with the present disclosure.

FIG. 2 is a schematic waveform diagram 200 illustrating an exemplary drive waveform 210 for driving a segment in a PCP. Here, the segment in the LC device is typically driven with a peak to peak voltage (Vp-p) in the range of 20 Vp-p to 60 Vp-p. In the illustrated embodiment, Vp-p is ±20V. Direct current (DC) balance may be maintained for these voltage levels in order to maximize the life of the LC material.

Other known drive schemes may be used in place of the above exemplary drive scheme shown in FIG. 2. For example, some known drive schemes for PCPs are described in commonly-owned U.S. Pat. No. 6,975,345 to Lipton, in commonly-owned U.S. patent application Ser. No. 13/473,447, entitled "Drive scheme for stereoscopic display polarization modulator and apparatus for same," filed May 16, 2012, and in U.S. Pat. No. 4,281,341 to Byatt, all of which are incorporated herein by reference in their entireties.

One challenge presented with driving PCP segments is that the LC device has fairly slow response time since the drive signal propagates through the R-C networks, and the LC's relatively viscous material takes time to respond to the electric field created by the drive signal in order for any optical effects to be visible. With some known drive schemes, response times are typically in the range of hundreds of microseconds to several milliseconds.

Figure 3:
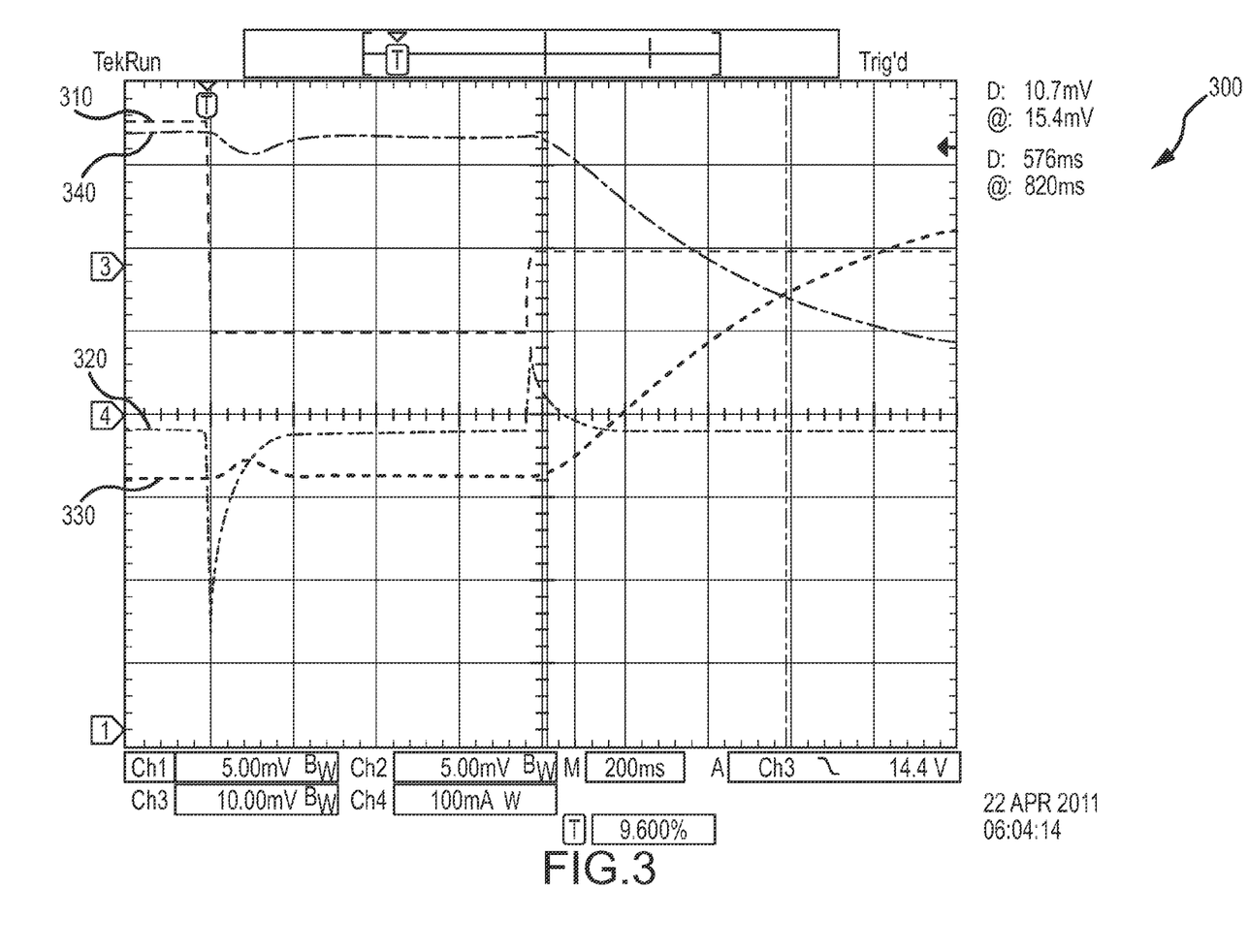
FIG. 3 is a schematic diagram illustrating the response time of an LC material, in accordance with the present disclosure.

FIG. 3 is a schematic diagram illustrating the response time of a typical LC material. In this case, the LC material is shown to have a slow response. Here, trace 310 is the LC drive signal, trace 320 is the LC drive current, and traces 330 and 340 are the transmitted light.

Systems that drive LC devices have historically utilized expensive and power hungry high current/high voltage operational amplifiers (op-amps) to drive the LC terminals. These devices were required in order to support the drive voltages and the surge current which flows into the LC material during the voltage transition. The surge current utilized for large LC devices driven at high voltage from both ends of an LC device can approach 1A for short periods of time. The op-amps to support such an application are only available from a limited number of vendors, and due to limited volume are typically several times the cost of a general purpose op-amp.

Due to the aforementioned challenges associated with driving the PCP LC, it is desirable to reduce the peak current required to drive an LC device. While it is true that an equivalent amount of energy is to be transferred into the LC material in order to produce the desired optical performance regardless of the peak current, lower peak current will reduce switch losses, and provide other benefits that improve system performance and reliability, while reducing cost. For discrete solutions, lower cost, more readily available op-amps can be utilized. Since generic op-amps generally require less operating power, system thermal requirements may be relaxed and peak temperatures may be reduced, thereby improving reliability. The lower voltage drop produced across the op-amp output transistors may allow for a reduced power supply voltage, thereby further reducing overall system power and temperature. For ASIC-based solutions, lower peak current facilitates the use of smaller, high channel-resistance output transistors reducing die size and as a result reducing die cost and improving yield.

For either solution, using wider current pulses with lower amplitude may allow for a simpler power system design with lower power converter operating frequencies and smaller associated capacitors. In addition, reducing the current flowing in the long flex circuit, which is typically used to connect the LC device to the drive electronics, results in a significant reduction in electromagnetic interference (EMI), which may eliminate the need for shielding and increases the probably of passing FCC and CE emissions testing.

Figure 4:
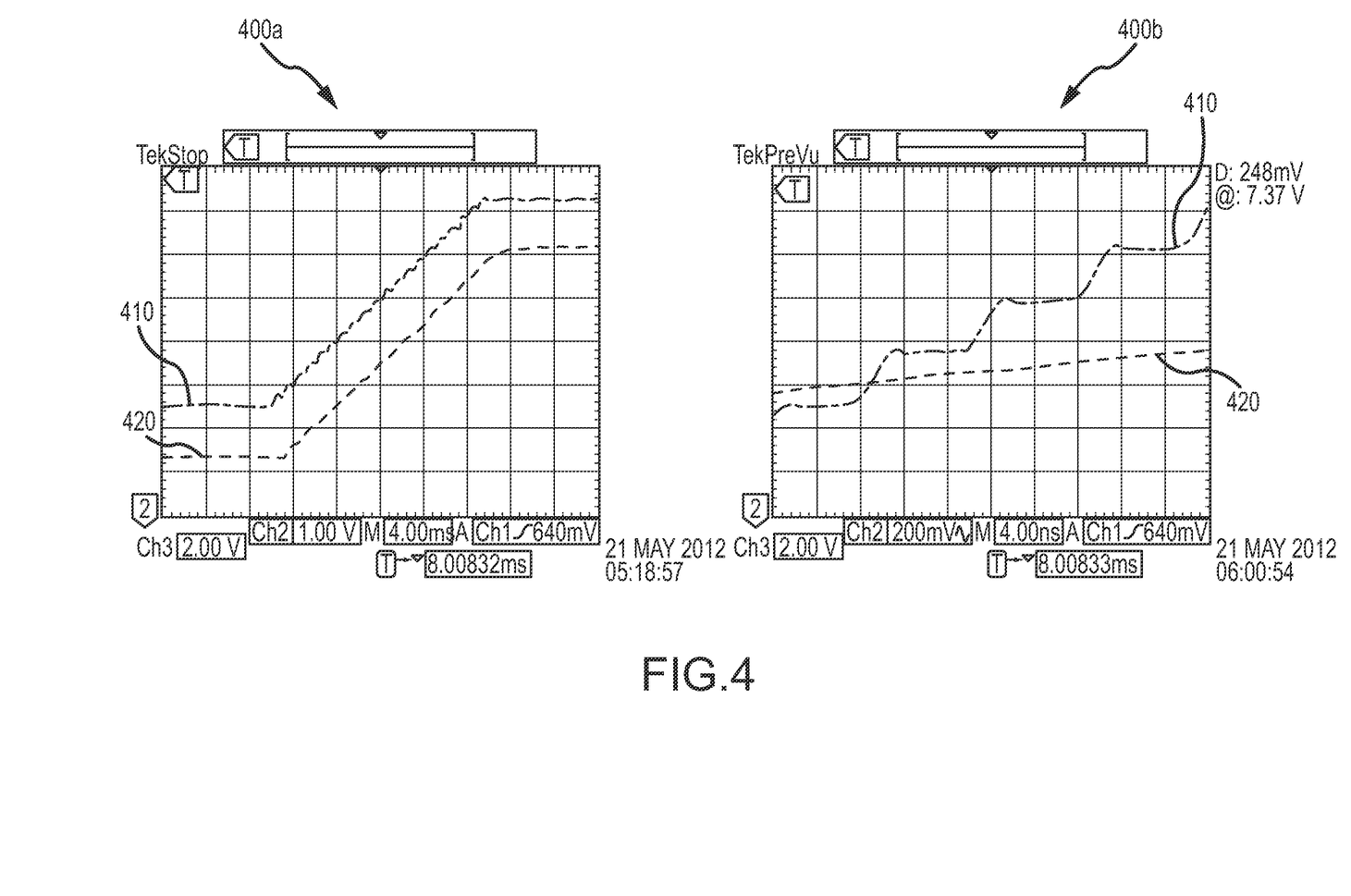
FIG. 4 is a set of graphs showing a waveform of the digital-to-analog converter output of a drive circuit and the resulting waveform of the LC drive voltage, in accordance with the present disclosure.

In order to control the edge rate of the LC drive signal, a state machine may be used to step the output of a digital-to-analog converter (DAC) of a drive circuit from the current drive level to a new drive level at a controllable slew rate, for example, the rate of change of the signal levels as a function of time. FIG. 4 illustrates plots 400a and 400b from an oscilloscope, showing a waveform of the DAC output (410) and the resulting waveform of the LC drive voltage (420). Plot 400b illustrates a zoomed-in view of the waveforms 410, 420 illustrated in plot 400a. As can be seen in plot 400b, a 250 mV step may be applied every microsecond. The waveform 410 shown in FIG. 4 uses a single slew rate value for the entire transition. The scheme proposed in the present disclosure also allows a single transition to be split into multiple segments, as shown in FIG. 5.

Figure 5:
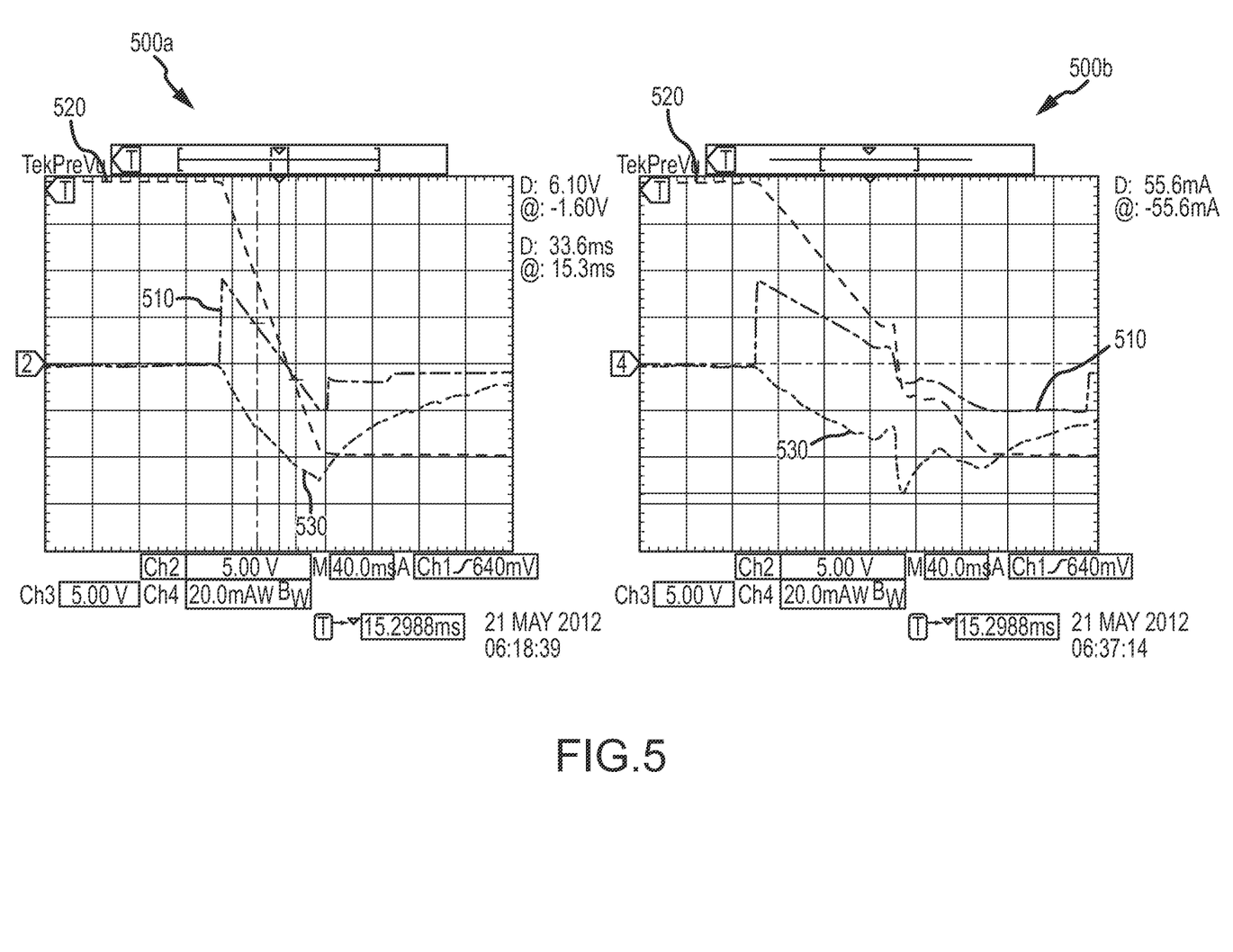
FIG. 5 is a graph showing a waveform of the DAC output and the resulting LC drive voltage, in accordance with the present disclosure.

FIG. 5 illustrates plots 500a and 500b from an oscilloscope showing a waveform of the DAC output (510) and the resulting LC drive voltage (520) using a drive scheme in accordance with the disclosed principles. Here, splitting a single transition into three discrete segments and placing the highest slew rate in the low voltage region moves the peak current (waveform 530) to the low voltage region of the transition (510), reducing the peak system power. Plot 500b illustrates the use of the scheme proposed in the present disclosure to split a single transition (500a) into three segments (500b) and controlling the slew rate of the drive waveform (520) such that the peak current (530) occurs at the zero voltage point of the drive waveform (520) thus reducing the peak system power.

Control of the slew rate and number of transition segments used to move the LC drive voltage level from one voltage to another may be achieved by reading a time sequential list of transition specifications, and applying each transition specification to the DAC input to move the LC drive voltage level in a controlled fashion. The rate at which the DAC is updated may be controlled by a time base tick, which may be generated by a counter that divides down the system clock. Each "transition specification" defines which drive channel is to transition, the slew rate for the transition, the time at which the transition is to start, and the end voltage of the transition. The slew rate provided in the transition specification is the number of DAC counts to be added or subtracted from the current DAC value at each time base tick. The start time for the transition is the number of time base ticks since the last video synchronization signal. The target voltage is provided in DAC counts.

The drive transition logic maintains the current voltage for each drive channel which it controls. This is done so that the logic can track the voltage level at which the transition is to start. The same logic refreshes the current voltage level between transitions for sample and hold amplifiers, which are not capable of maintaining the voltage level for the entire period between transitions. The drive transition logic verifies that moving the DAC input value by the number of DAC counts specified by the slew rate will not overshoot the target voltage. In order to prevent overshoot, the last voltage step may be less than slew rate DAC counts.

As indicated previously and as shown in FIG. 2, DC balance is preferably maintained across the LC device by periodically alternating the polarity of the drive signal. In order to provide alternating polarity while minimizing the number of transition specifications, the system logic will preferably alternately use the digital code for the target voltage provided in the transition specification or its two's compliment.

Figure 6:
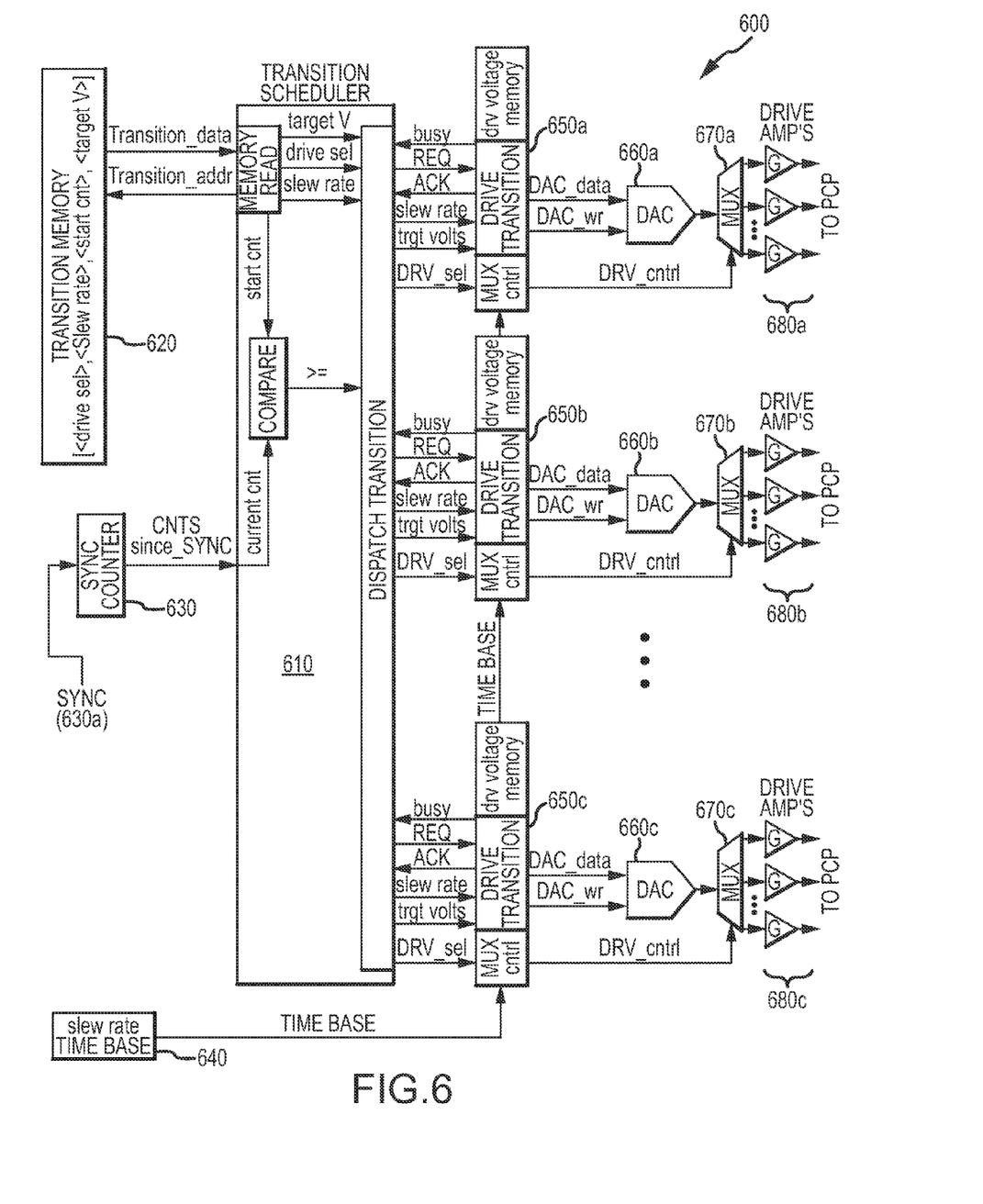
FIG. 6 is a schematic circuit diagram of exemplary control circuitry for the LC drive scheme, in accordance with the present disclosure.

FIG. 6 illustrates a schematic circuit diagram of exemplary control circuitry 600 for an LC drive scheme as disclosed herein, including a Transition Scheduler 610. The Transition Scheduler 610 reads specifications for transition data from a Transition Memory 620. The data for each transition indicates which drive channel is to transition, the slew rate for the transition, the time at which the transition is to start and the end voltage of the transition. The start time for the transition is based on a SYNC Counter 630, which is reset by a system generated synchronization signal 630a, and increments at a known rate. When the SYNC Counter 630 value is greater than or equal to the transition start time, the Transition Scheduler 610 will request the Drive Transition logic 650a-650c to control a corresponding DAC 660a-660c to move the voltage from the current level to the next level in the Transition Specification. The rate at which the voltage transition occurs is controlled by the slew rate read from the Transition Memory 620 being applied at each slew rate time base tick 640 until the end voltage is achieved.

As indicated in circuit diagram, each single Drive Transition module 650a-650c is multiplexed by corresponding Multiplexers 670a-670c to multiple drive channels, via corresponding groups of Drive Amplifiers 680a-680c, at the output of the DACs 660a-660c. Each of the Drive Transition 650a-650c logic maintains the current voltage for each drive channel which it controls. This is done so that the logic can track the voltage level at which the transition is to start. The same logic refreshes the current voltage level between transitions for sample and hold drive amplifiers (680a-680c), which may not be capable of maintaining the voltage level for the entire period between transitions.

The Drive Transition logic 650a-650c uses a time base tick 640 to set the time between DAC updates, this allows the slew rate to be specified in units of DAC counts per time base tick. This logic evaluates the number of DAC counts to reach the target voltage. If this value is less than the slew rate, the lower step value will be applied to prevent overshoot on the drive output.

The Transition Scheduler 610 handles the case of a transition specification which uses a Drive Transition module 650a-650c which is currently busy transitioning another drive channel for which it is responsible. In this case, the Scheduler 610 can either block any further updates to any other drive channel and wait for the required resource to be free, or queue the request and read another transition specification for which resources may be available. In a well-designed system, however, this should preferably be avoided if possible.

The Transition Scheduler 610 is also responsible for maintaining DC balance on the LC device by using the digital code for the target voltage from the transition specification directly or it's two's compliment on alternating video frames, as defined by the video synchronization signal.

Figure 7:
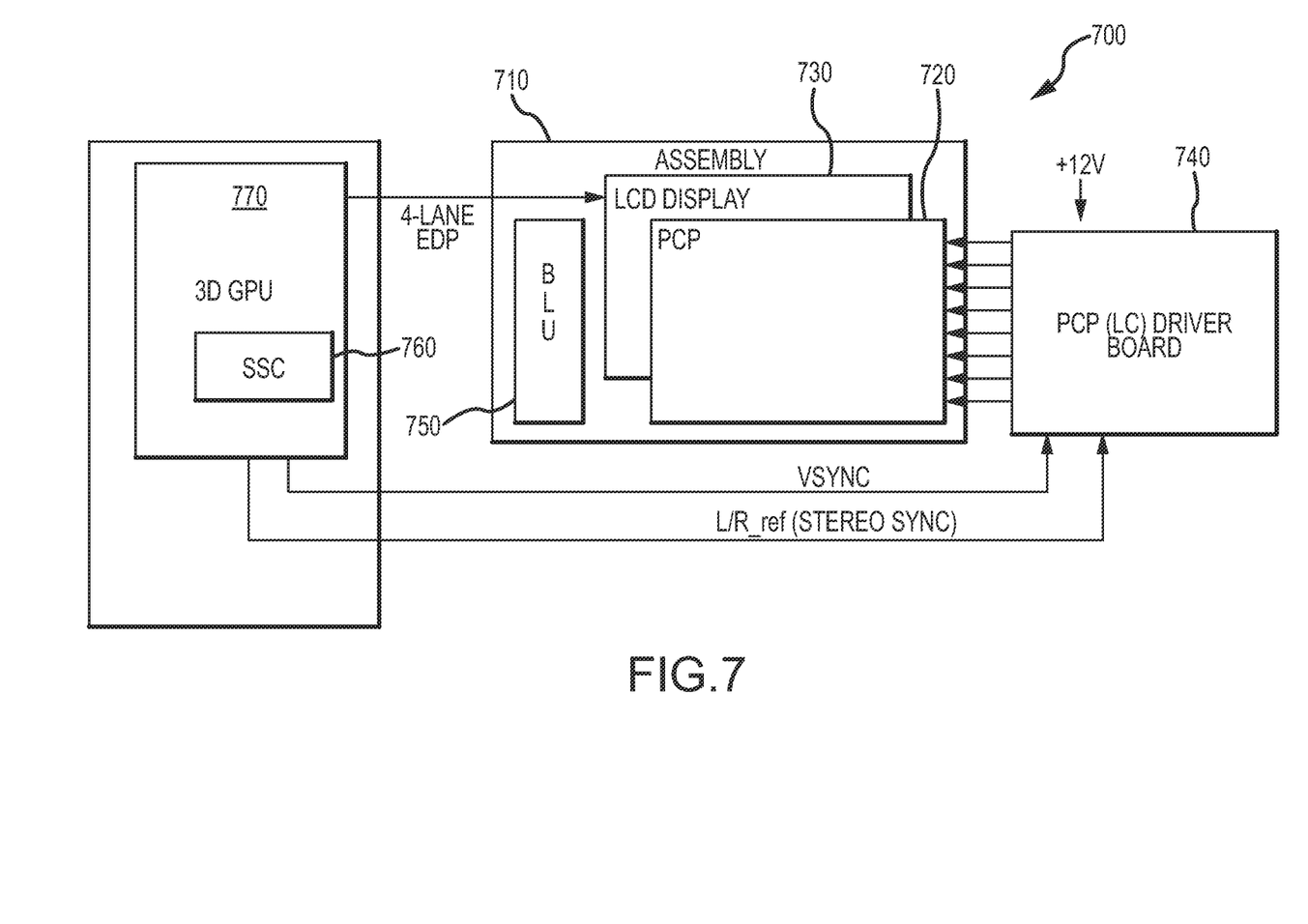
FIG. 7 is a schematic block diagram of a system for implementing a stereoscopic direct view display system, in accordance with the present disclosure.

The PCP drive electronics scheme disclosed herein is a part of a system solution that may utilize several elements for implementation of a complete 3D direct view display solution. FIG. 7 illustrates a schematic block diagram of an exemplary system 700 for implementing a stereoscopic direct view display system in accordance with the disclosed principles. An exemplary stereoscopic direct view display system 700 may include several exemplary elements. A display module assembly 710 may be provided in the system 700. The assembly 710 may be comprised of PCP 720 which may be bonded to an LCD display panel 730. In a more specific embodiment, the PCP 720 may be a RealD Inc. PCP, and the LCD display panel 730 be a 120 Hz active-matrix liquid crystal display (AMLCD) with additional flexible printed circuit (FPC/Flex) from the PCP that is coupled to the PCP driver board 740. Additionally, the PCP driver board 740 comprises the drive scheme and exemplary circuitry disclosed herein. A backlight unit (BLU) 750 is also included in the system 700. In a specific embodiment, the BLU 750 may be a cold cathode fluorescent lamp (CCFL) or light emitting diode (LED) backlight, and optimization advantages are realized when a scanning or array BLU 750 is controlled to work in synch with the PCP 720.

A Stereo Signal Conditioning (SSC) module 760 may also be employed, which is a proprietary technique by the Assignee of the present disclosure for reducing 3D crosstalk (also referred to as "ghosting"). Such SSC may be implemented in conjunction with a system graphics processing unit (GPU) 770. The GPU 770 provides the video synchronization (VSYNC) and the stereo synchronization (L/R Sync) signals to the PCP driver board 740, as illustrated, for synchronization with the left and right eye images displayed by the LCD. In addition, the GPU 770 provides the video image data to the LCD display 730 by use of an embedded display port (EDP) interface or other signaling method. Finally, in order for a viewer to experience the 3D stereoscopic display, corresponding eyewear should be worn, for example, circularly polarized passive eyewear. When viewing a conventional 2D image, no eyewear needs to be worn by the viewer.

Performance

Figure 8:
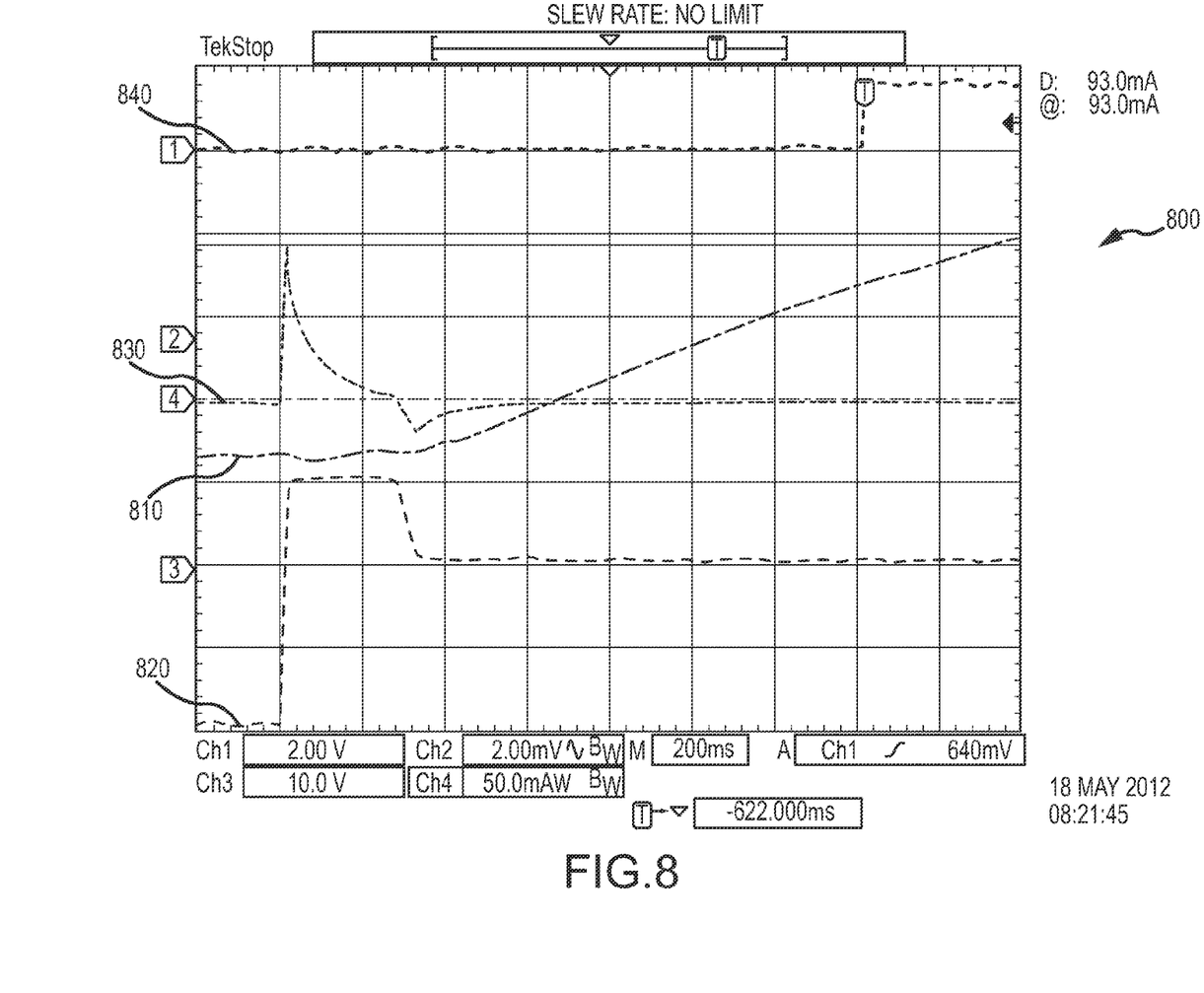
FIGS. 8 to 12 are graphs illustrating measurements of the current for various slew rates in a stereoscopic system driving a single PCP segment, in accordance with the present disclosure.
Figure 9:
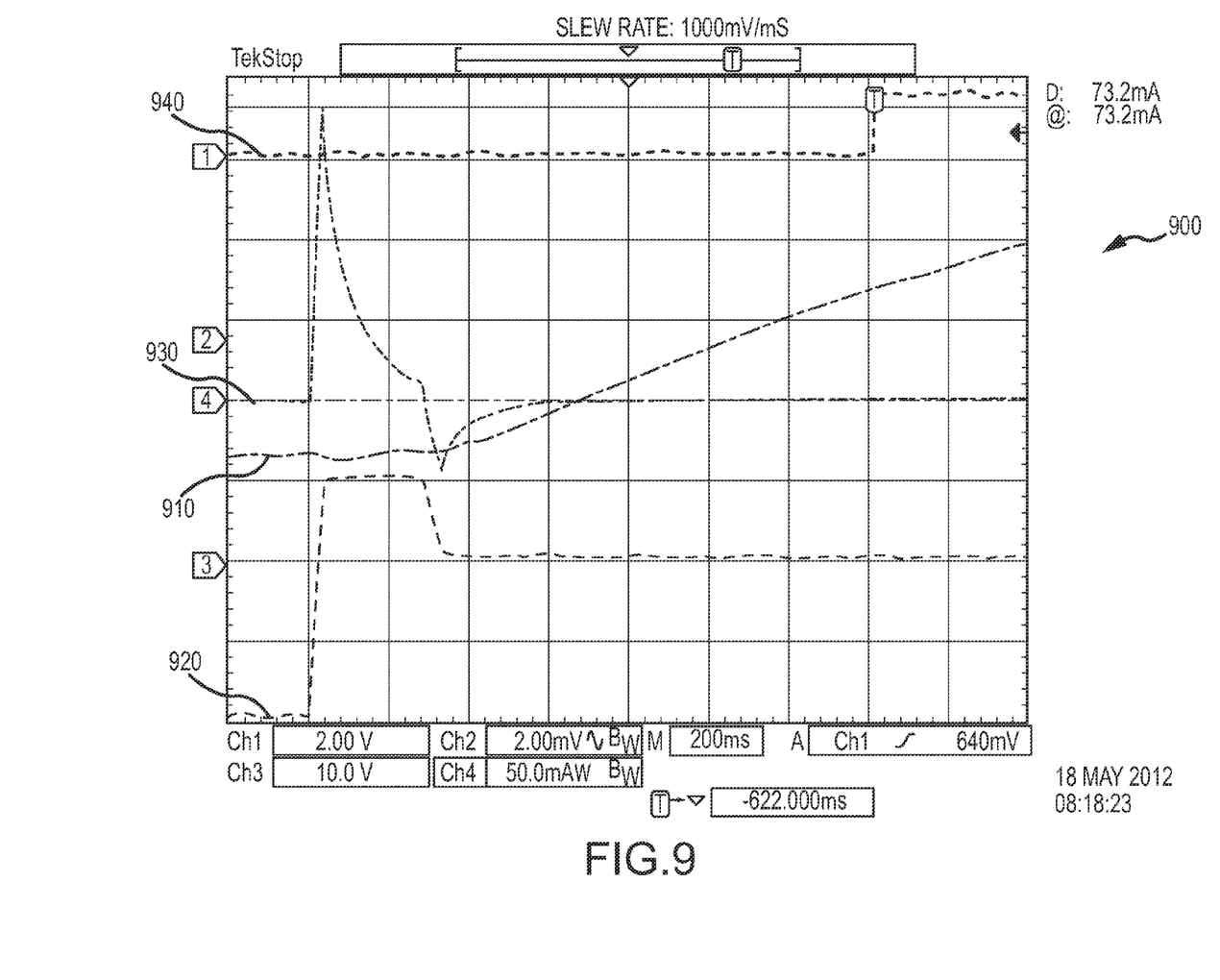
Figure 10:
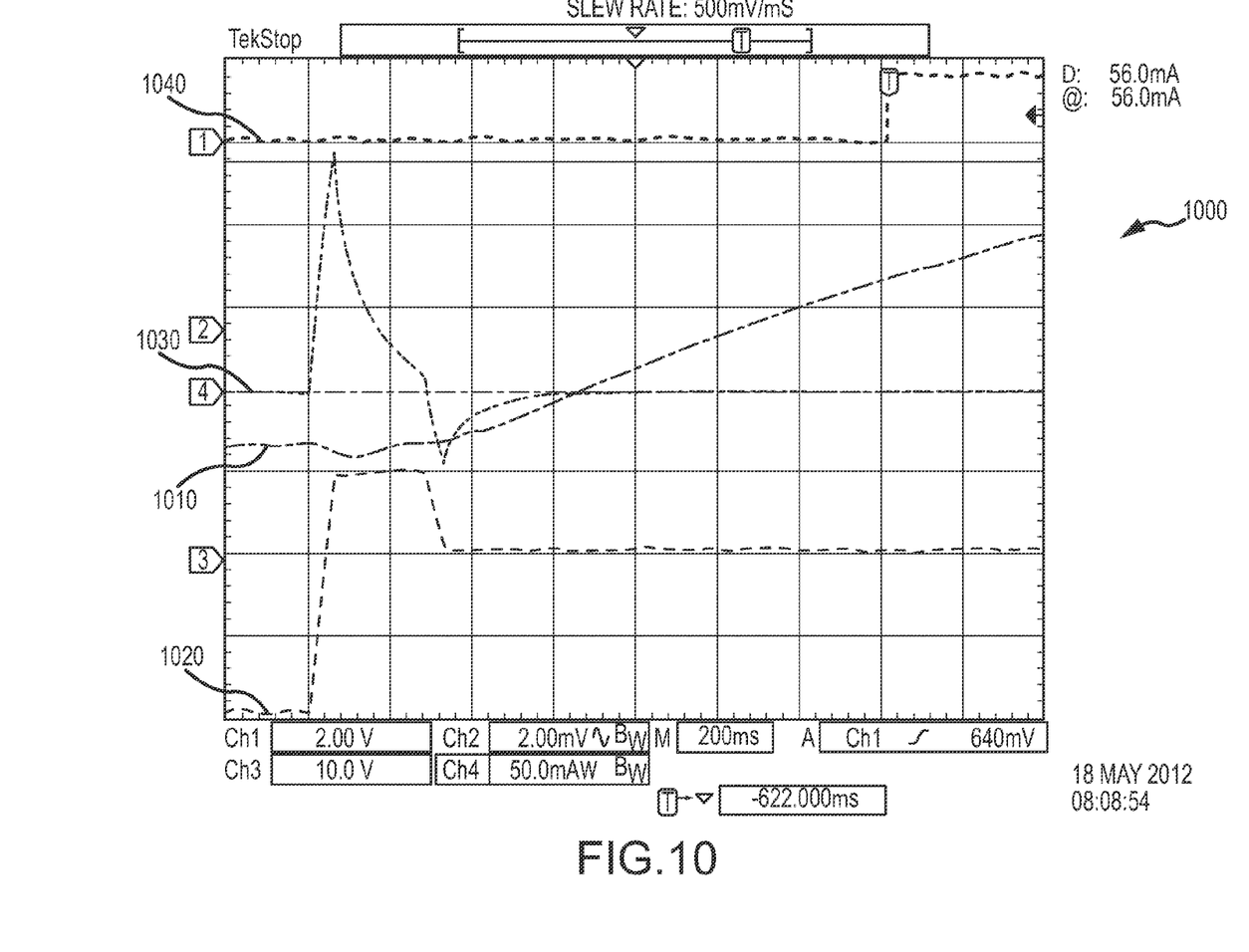
Figure 11:
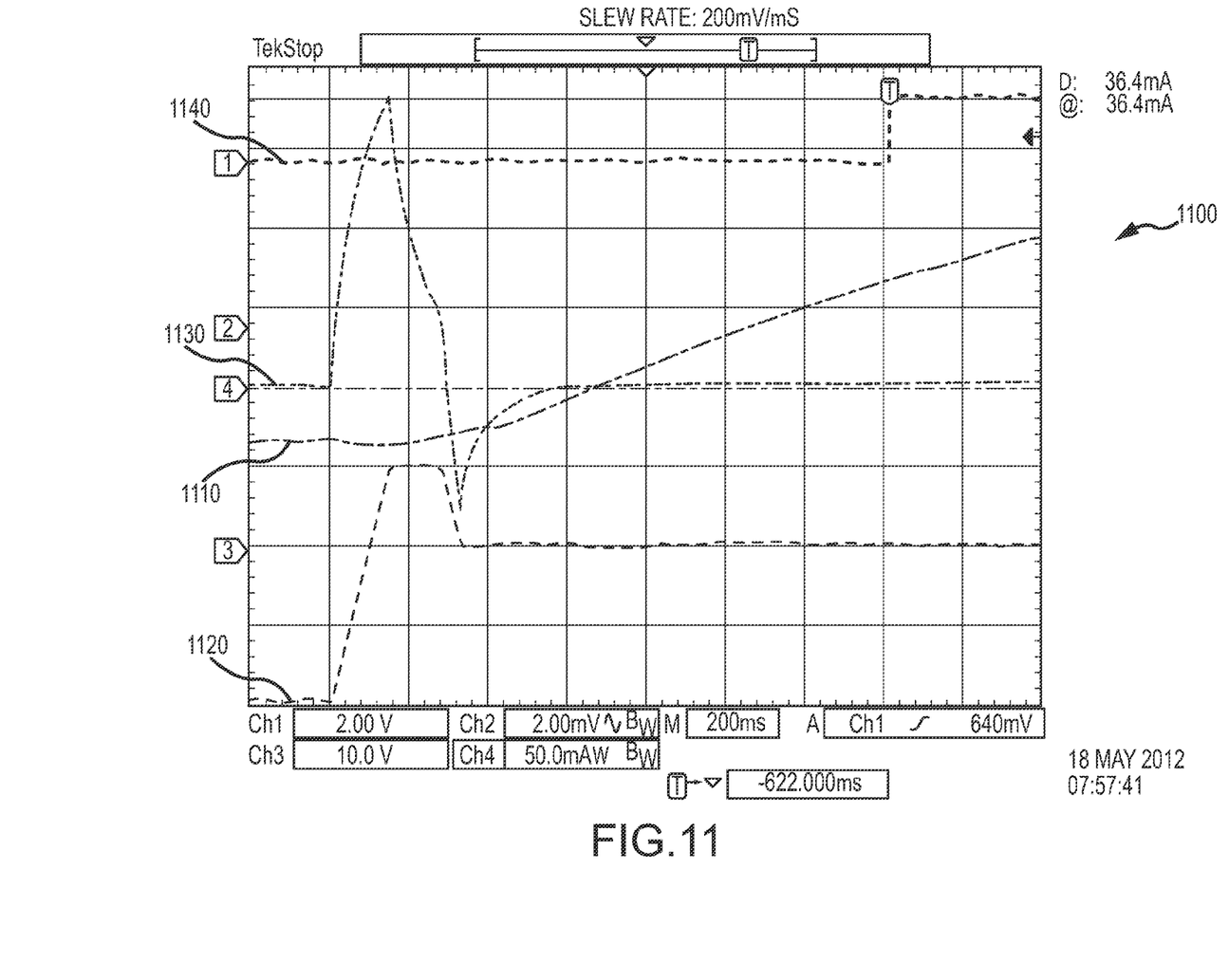
Figure 12:
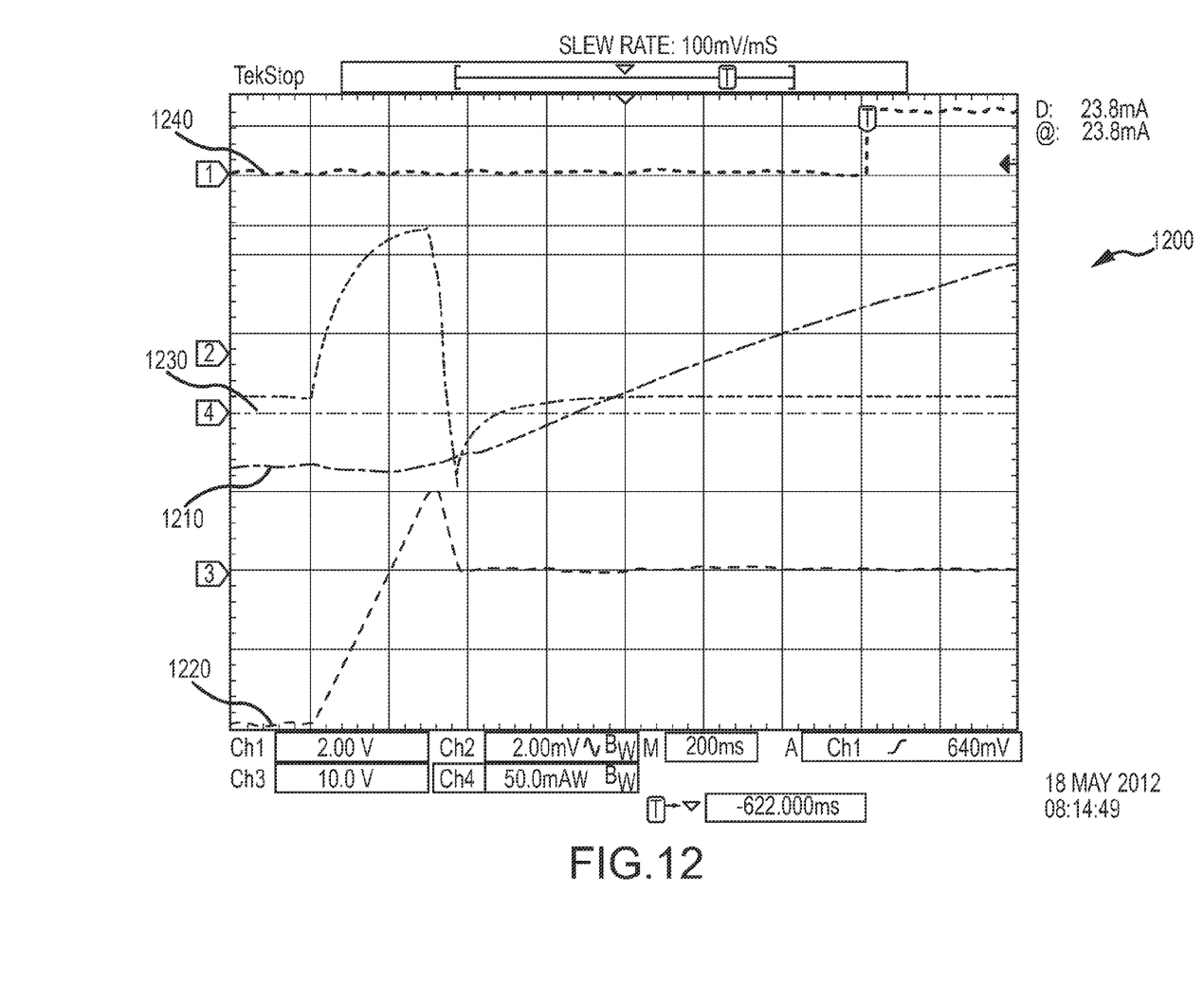

To measure the performance of a drive scheme in accordance with the disclosed principles, the peak current for various slew rates were measured in a single PCP segment of a display system constructed as disclosed herein. The results are summarized in TABLE 1, and shown in the plots in FIGS. 8-12 of the measurements made using an oscilloscope. Specifically, FIG. 8 is a plot 800 illustrating the measurements with no limit on the slew rate, FIG. 9 is a plot 900 illustrating the measurements with a slew rate of 1000 mV/µS, FIG. 10 is a plot 1000 illustrating the measurements with a slew rate of 500 mV/µS, FIG. 11 is a plot 1100 illustrating the measurements with a slew rate of 200 mV/µS, and FIG. 12 is a plot 1200 illustrating the measurements with a slew rate of 100 mV/µS. In all of measurements illustrated in FIGS. 8-12, waveforms 810, 910, 1010, 1110, 1210 are the optical signals, waveforms 820, 920, 1020, 1120, 1220 are the LC drive signals, waveforms 830, 930, 1030, 1130, 1230 are the current signals, and waveforms 840, 940, 1040, 1140, 1240 are the SYNC signals.

Generally speaking, the slower the slew rate of a signal is, the more time is needed for the signal to achieve a predetermined voltage level to drive the liquid crystal as desired. However, for schemes implemented in accordance with the disclosed principles, in all of the various slew rates tested the optical performance appeared to be substantially similar, as viewed using a ThorLabs® PDA100A photodetector and illustrated in the plots in FIGS. 8-12. But the peak current at the various slew rates tested demonstrated significant drops in drive current usage as the slew rate decreased. Note that the measurements were taken with the LC drive channel driving from only one end of the PCP stripe. When driving both ends, the drive current required will double.

TABLE 1

| Slew Rate | Peak Current |
| --- | --- |
| No limit[1] | 93 mA |
| 1000 mV/µS | 73.2 mA |
| 500 mV/µS | 56 mA |
| 200 mV/µS | 36.4 mA |
| 100 mV/µS | 23.8 mA |

[1]Limited by Op-Amp short circuit limit, LC sheet resistance, and drive output resistor.

As may be used herein, the terms "substantially" and "approximately" provide an industry-accepted tolerance for its corresponding term and/or relativity between items. Such an industry-accepted tolerance ranges from less than one percent to ten percent and corresponds to, but is not limited to, component values, angles, et cetera. Such relativity between items ranges between less than one percent to ten percent.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

What is claimed is:

1. A method of controlling a polarization modulator in a polarization-based stereoscopic display device, the method comprising:
    providing digital signals to each of a plurality of drive circuits to generate a drive voltage from each drive circuit, said drive voltages driving the polarization modulator;
    determining a time sequential list of transition specifications configured to provide discrete transitions in one or more of the drive voltages; and
    adjusting, in accordance with the time sequential list, the digital signals provided to each of the one or more drive circuits receiving a transition thereby altering their drive voltages based on the transition specifications.

2. A method in accordance with claim 1, wherein each transition specification comprises:
    data identifying which of the plurality of drive circuits will receive a transition,
    a slew rate for said transition,
    a time at which said transition will start, and
    a target drive voltage for the drive circuit receiving said transition.

3. A method in accordance with claim 2, wherein the time sequential list is determined based on a time base tick derived from a system clock.

4. A method in accordance with claim 3, wherein the slew rate provided in the transition specification comprises a number of counts in the digital signals to be added or subtracted, at each time base tick, from a current value in the digital signals provided to a drive circuit receiving a transition.

5. A method in accordance with claim 3, wherein the start time for the transition is the number of time base ticks since the last time a video synchronization signal has been sent to the drive circuit receiving a transition.

6. A method in accordance with claim 2, wherein the target voltage is provided in counts comprised in the digital signals sent to a drive circuit receiving a transition.

7. A method in accordance with claim 1, wherein the drive circuits each comprise a digital-to-analog converter, a multiplexer, and one or more amplifiers, wherein the digital-to-analog converters are configured to receive the digital signals and the amplifiers are configured to provide the drive voltages.

8. A circuit for controlling a polarization modulator in a polarization-based stereoscopic display device, the circuit comprising:
    a plurality of drive circuits, each configured to generate a drive voltage for driving the polarization modulator;
    drive transition logic configured to provide digital signals to each of the plurality of drive circuits to generate the drive voltages from each drive circuit;
    transition memory configured to store transition specifications configured to provide discrete transitions in one or more of the drive voltages; and
    a transition scheduler configured to determine a time sequential list for applying the transition specifications to one or more of the plurality of drive circuits, the transition scheduler causing, in accordance with the time sequential list, the drive transition logic to adjust the digital signals provided to each of the drive circuits receiving a transition, thereby altering their drive voltages based on the transition specifications.

9. A circuit in accordance with claim 8, wherein each transition specification comprises:
   data identifying which of the plurality of drive circuits will receive a transition,
   a slew rate for said transition,
   a time at which said transition will start, and
   a target drive voltage for the drive circuit receiving said transition.

10. A circuit in accordance with claim 9, wherein the drive transition logic adjusts the digital signals based on a time base tick derived from a system clock.

11. A circuit in accordance with claim 10, wherein the slew rate provided in the transition specification comprises a number of counts in the digital signals to be added or subtracted, at each time base tick, from a current value in the digital signals provided to a drive circuit receiving a transition.

12. A circuit in accordance with claim 10, wherein the start time for the transition is the number of time base ticks since the last time a video synchronization signal has been sent to the drive circuit receiving a transition.

13. A circuit in accordance with claim 9, wherein the target voltage is provided in counts comprised in the digital signals sent to a drive circuit receiving a transition.

14. A circuit in accordance with claim 8, wherein the drive circuits each comprise a digital-to-analog converter, a multiplexer, and one or more amplifiers, wherein the digital-to-analog converters are configured to receive the digital signals and the amplifiers are configured to provide the drive voltages.

15. A polarization-based stereoscopic display system, comprising:
   a display assembly comprising a polarization control panel (PCP) and a liquid crystal display (LCD) panel;
   a backlight panel for providing illumination to the LCD panel;
   a PCP drive circuit for controlling the PCP, the PCP circuit comprising:
      a plurality of drive circuits, each configured to generate a drive voltage for driving the polarization modulator,
      drive transition logic configured to provide digital signals to each of the plurality of drive circuits to generate the drive voltages from each drive circuit,
      transition memory configured to store transition specifications configured to provide discrete transitions in one or more of the drive voltages, and
      a transition scheduler configured to determine a time sequential list for applying the transition specifications to one or more of the plurality of drive circuits, the transition scheduler causing, in accordance with the time sequential list, the drive transition logic to adjust the digital signals provided to each of the drive circuits receiving a transition, thereby altering their drive voltages based on the transition specifications; and
   an image processing unit configured to provide image signals to the LCD panel and synchronization signals for use by the PCP drive circuit.

16. A system in accordance with claim 15, wherein each transition specification comprises:
   data identifying which of the plurality of drive circuits will receive a transition,
   a slew rate for said transition,
   a time at which said transition will start, and
   a target drive voltage for the drive circuit receiving said transition.

17. A system in accordance with claim 16, wherein the drive transition logic adjusts the digital signals based on a time base tick derived from a system clock.

18. A system in accordance with claim 17, wherein the slew rate provided in the transition specification comprises a number of counts in the digital signals to be added or subtracted, at each time base tick, from a current value in the digital signals provided to a drive circuit receiving a transition.

19. A system in accordance with claim 17, wherein the start time for the transition is the number of time base ticks since the last time a video synchronization signal has been sent to the drive circuit receiving a transition.

20. A system in accordance with claim 16, wherein the target voltage is provided in counts comprised in the digital signals sent to a drive circuit receiving a transition.

* * * * *